Nov. 10, 1959  C. B. SHEPPARD ET AL  2,912,277
TWO-WAY MOVABLE ROOF MECHANISM
Filed Jan. 25, 1956  10 Sheets-Sheet 7

INVENTORS.
CHARLES BRADFORD SHEPPARD
CHARLES I. BOHLEN
BY
Caesar and Rivise
ATTORNEYS

INVENTORS
CHARLES BRADFORD SHEPPARD
CHARLES I. BOHLEN
BY
*Caesar and Rivise*
ATTORNEYS

Nov. 10, 1959 C. B. SHEPPARD ET AL 2,912,277
TWO-WAY MOVABLE ROOF MECHANISM
Filed Jan. 25, 1956 10 Sheets-Sheet 9

INVENTORS.
CHARLES BRADFORD SHEPPARD
CHARLES I. BOHLEN
BY
*Caesar and Rivise*
ATTORNEYS United States Patent Office 2,912,277
Patented Nov. 10, 1959

2,912,277
TWO-WAY MOVABLE ROOF MECHANISM

Charles Bradford Sheppard, Meadowbrook, and Charles I. Bohlen, Doylestown, Pa., assignors, by mesne assignments, to Fruehauf Trailer Company, Detroit, Mich., a corporation of Michigan Application January 25, 1956, Serial No. 561,215

18 Claims. (Cl. 296—137)

This invention relates to a two-way movable roof mechanism and constitutes an improvement over the mechanism shown and described in the application Serial No. 321,208, filed November 18, 1952, now Patent No. 2,757,043.

The primary object of the present invention is to provide a movable roof mechanism which is structurally less complex and functionally simpler and more efficient than that described in the aforementioned application.

Thus in the present device the roof is movable longitudinally two ways on the body and therefore, redistortion of the body to its true rectangular shape prior to locking the header is accomplished by a single indexing and locking mechanism adjacent one rear corner of the vehicle and a single jack means adjacent the other rear corner of the vehicle.

The indexing and locking mechanism automatically locks the roof to the body in response to a predetermined movement of the roof and thereby aligns two upper corners of one side wall of the body with the corresponding corners of the roof.

The jack means is on the other side wall and is operatively connected to the roof. It exerts a force substantially parallel to the longitudinal axis of the body to redistort the body so that the upper corners of the other side wall are brought into alignment with the corresponding corners of the roof. The preferred jack means is comprised of a hydraulic pump operated ram disposed on both sides of the mechanism operatively connecting the roof to the other side wall of the body.

The present mechanism also includes a roof driving mechanism which is an improvement over that described in the aforementioned application.

The present mechanism also includes a novel door construction especially designed for use with a movable roof.

Other objects of the invention will become more apparent as the following description proceeds in conjunction with the accompanying drawings, wherein:

Specific reference is now made to the drawings wherein similar reference characters are used for corresponding elements throughout.

Figure 1:
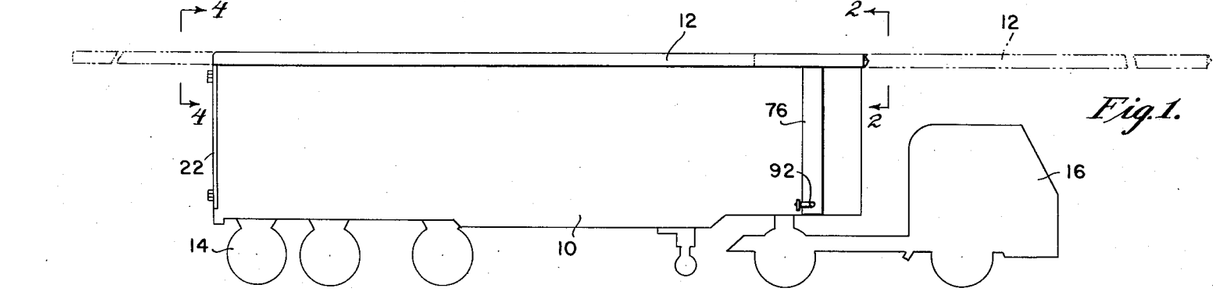
Figure 1 is a diagrammatic side elevation of a vehicle incorporating the present invention.
Figure 2:
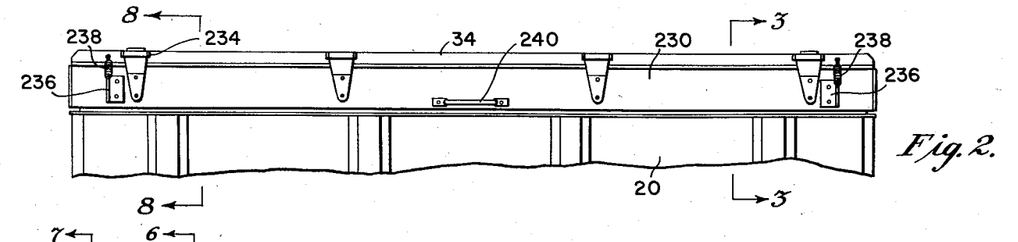
Figure 2 is a fragmentary elevation of the front of the the vehicle looking from the plane of line 2—2 of Figure 1.

The invention, for illustrative but non-limitative purposes, is shown applied to a van type trailer including a body 10 and a movable roof mechanism 12 mounted thereon. The body is supported upon rear wheels 14 and is adapted to be hitched to a prime mover 16. The body is substantially rectangular including side walls 18 and 19, a front wall 20, rear doors 22, and a floor 24, the side walls including outer reinforcing posts.

Figure 9:
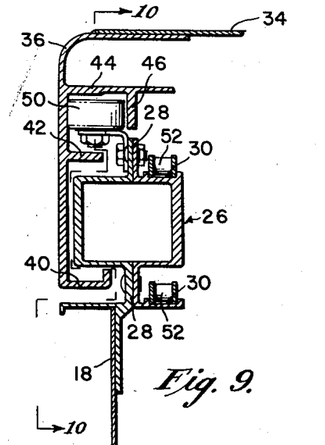
Figure 9 is an enlarged sectional view taken on the line 9—9 of Figure 8.
Figure 10:
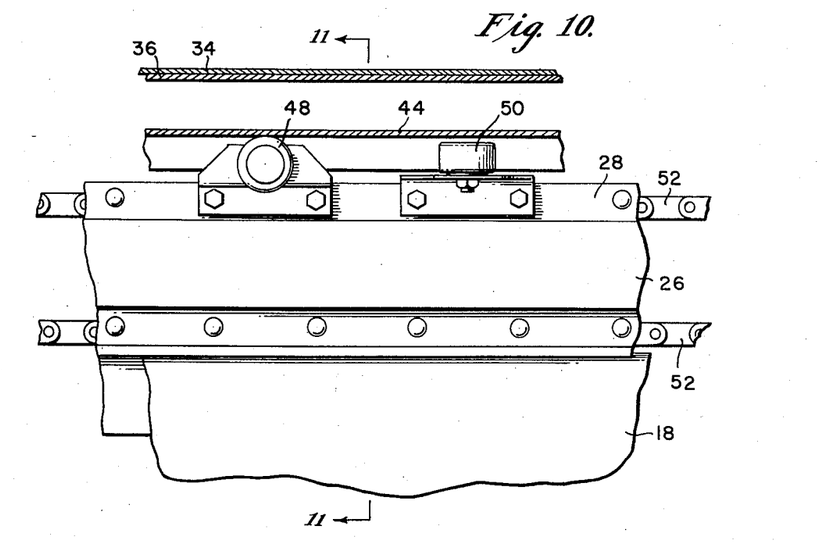
Figure 10 is an enlarged elevation taken from the plane of line 10—10 of Figure 9.
Figure 11:
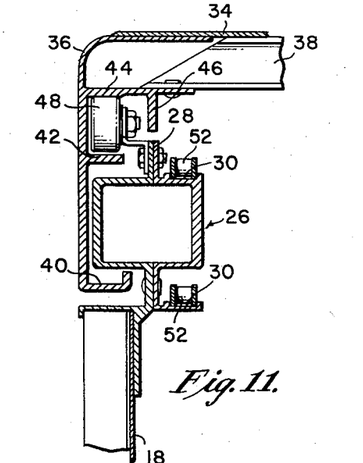
Figure 11 is a sectional view taken on the line 11—11 of Figure 10.
Figures 13, 14, 15:
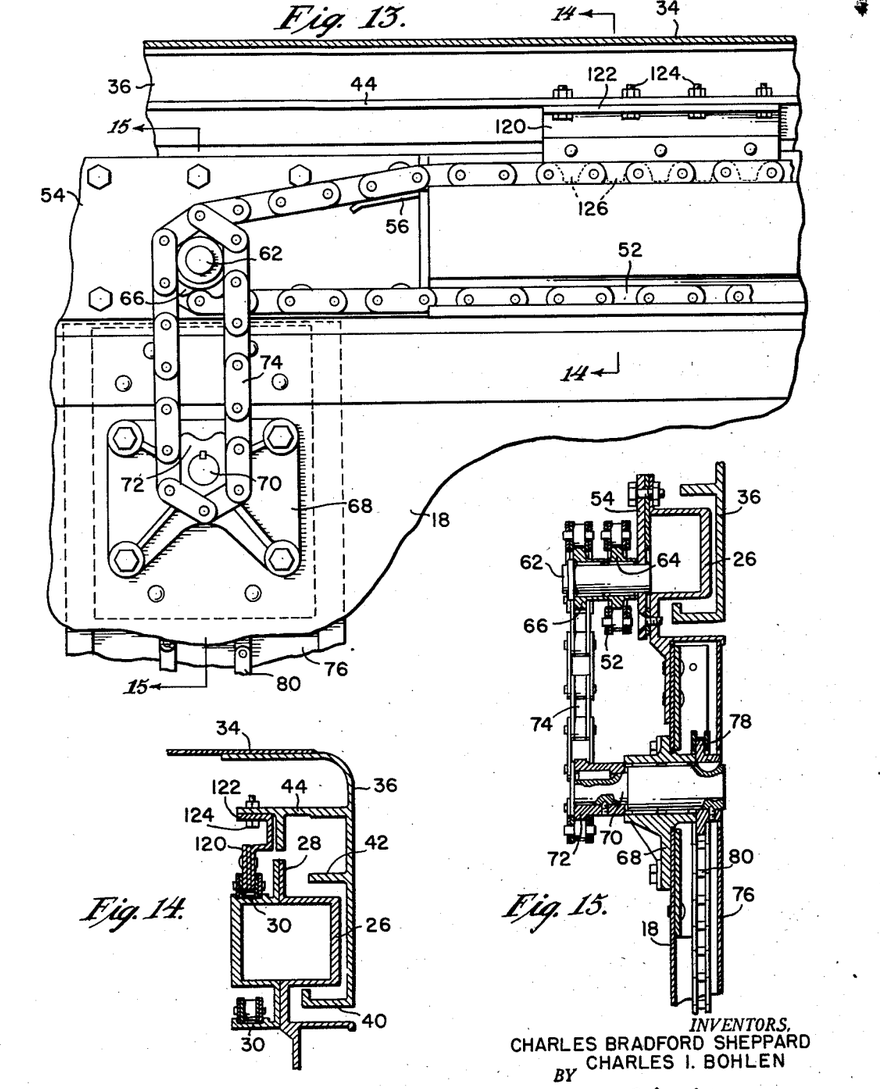
Figure 13 is a view similar to Figure 12 and illustrating the rear end of the drive chain.
Figure 14 is a sectional view taken on the line 14—14 of Figure 13.
Figure 15 is a sectional view taken on the line 15—15 of Figure 13.
Figure 16:
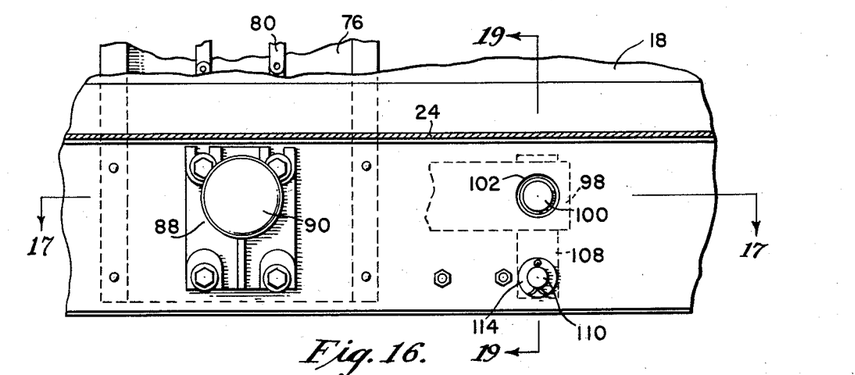
Figure 16 is an enlarged view of an area of Figure 9 showing the lower end of the roof driving mechanism.

Secured upon the upper ends of the side walls are longitudinal box-like members or extrusions 26 of a profile preferably like that shown in the drawings, particularly Figures 9 and 11. The member 26 comprises two sections having abutting flanges 28 which are secured together to form the box. At its inner side the member 26 includes upper and lower channels or races 30 for a purpose later to appear. To the upper end of the front wall 20 is secured a transverse member 32 which is also box-like.

The roof 12 consists of a substantially rectangular roof sheet 34, a depending peripheral skirt 36 secured thereto and transverse reinforcing beams 38. The profile of the skirt 36 is preferably like that shown in the drawings, particularly Figures 9 and 11, and consists of a lower inwardly extending flange 40, an intermediate inwardly extending flange 42 and an upper inwardly extending flange 44 having a depending member 46.

Appropriately secured to the upper flanges 28 of the members 26 on the upper ends of the side walls 18 and 19 are alternately spaced rollers 48 and 50, the former being rotatable about a horizontal axis and the latter about a vertical axis.

The roof is slidably mounted on the side walls 18 and 19 in the manner shown clearly in Figures 9 and 11; that is, the flanges 42 and 44 and the depending member 46 of the roof skirt define a race or trackway in which the rollers ride and the box-like member 26 on the top of the side wall is located between the lower and intermediate flanges 40 and 42 of the roof skirt. Thus the roof is capable of smooth guided movement on the body as will be readily evident.

A means is provided to selectively drive the roof in either of two directions longitudinally of the body. This means comprises an endless chain 52 the flights of which ride in the upper and lower channels or races 30 of the member 26 on the side wall. Adjacent each end of the chain is a bracket 54 which is appropriately secured to the upper member 26 of the side wall, the bracket carrying an inclined chain-engaging ramp 56 and a bolt and nut means 58 associated therewith to adjustably tension the chain.

One end bracket 54 rotatably journals a sprocket 60 over which one end of the chain 52 is entrained. The other end bracket rotatably journals a shaft 62 upon which is mounted two sprockets 64 and 66, the inner one 64 engaging the endless chain 52. Secured to the side wall beneath the shaft 62 is another bracket 68 which rotatably journals a shaft 70 to which is secured a sprocket 72, there being an endless vertical chain 74 which is entrained over the sprockets 66 and 72.

Along a portion of the side wall of the vehicle is a hollow post 76 through which the shaft 70 extends, the shaft carrying a sprocket 78 which is located between the side wall 18 and the wall of the post 76. A long vertical endless chain 80 is positioned between the side wall 18 and post 76 and is entrained over the sprocket 78 and a further lower sprocket 82, the latter being secured to a tubular bearing 84 that extends inwardly through the side wall 18 beneath the floor 24. The bearing is carried by a member 86 which is attached by a bracket 88 to the side wall of the vehicle, the member including a housing 90.

A handle member 92 is provided which includes a shaft 94 that extends slidably through the bearing 84 and through an aperture 96 in the post 76. The handle also includes a bar 98 which is secured at one of its ends to the shaft 94 and carries at its other end a hand grip 100, the latter slidably extending through an aperture 102 in the side wall. The end of the bearing 84 in the housing 90 carries a clutch plate 104 and the end of the shaft 94 in the housing carries a complementary clutch plate 106.

Figures 17, 18, 19:
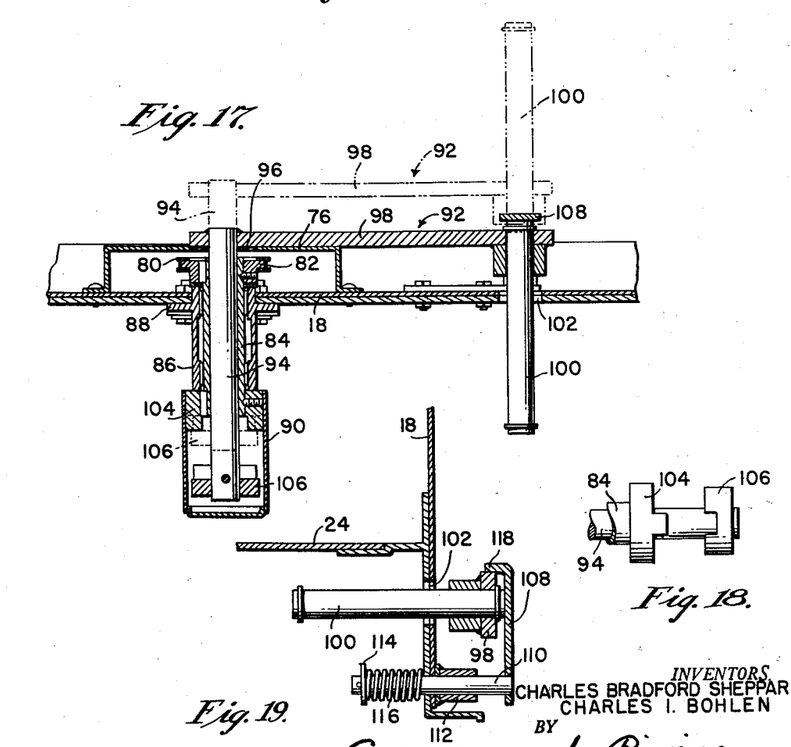
Figure 17 is a sectional view taken on the line 17—17 of Figure 16.
Figure 18 is an elevation of the clutch mechanism.
Figure 19 is a sectional view taken on the line 19—19 of Figure 16.
Figure 20:
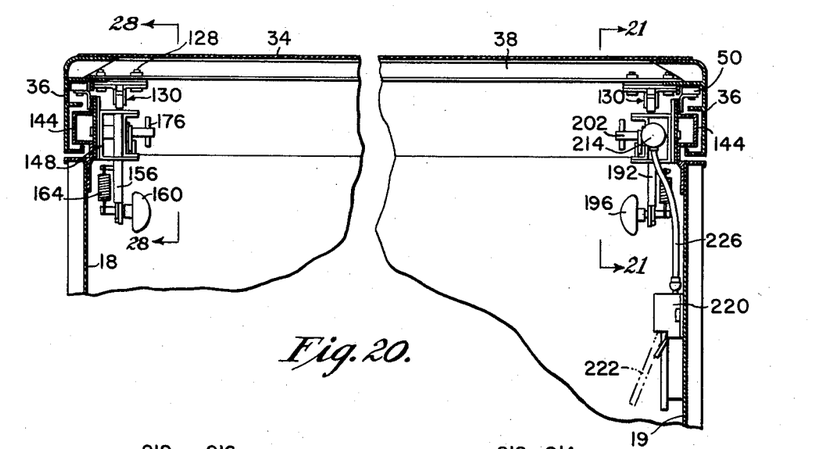
Figure 20 is a broken away sectional view taken on the line 20—20 of Figure 8.
Figures 21, 22, 25:
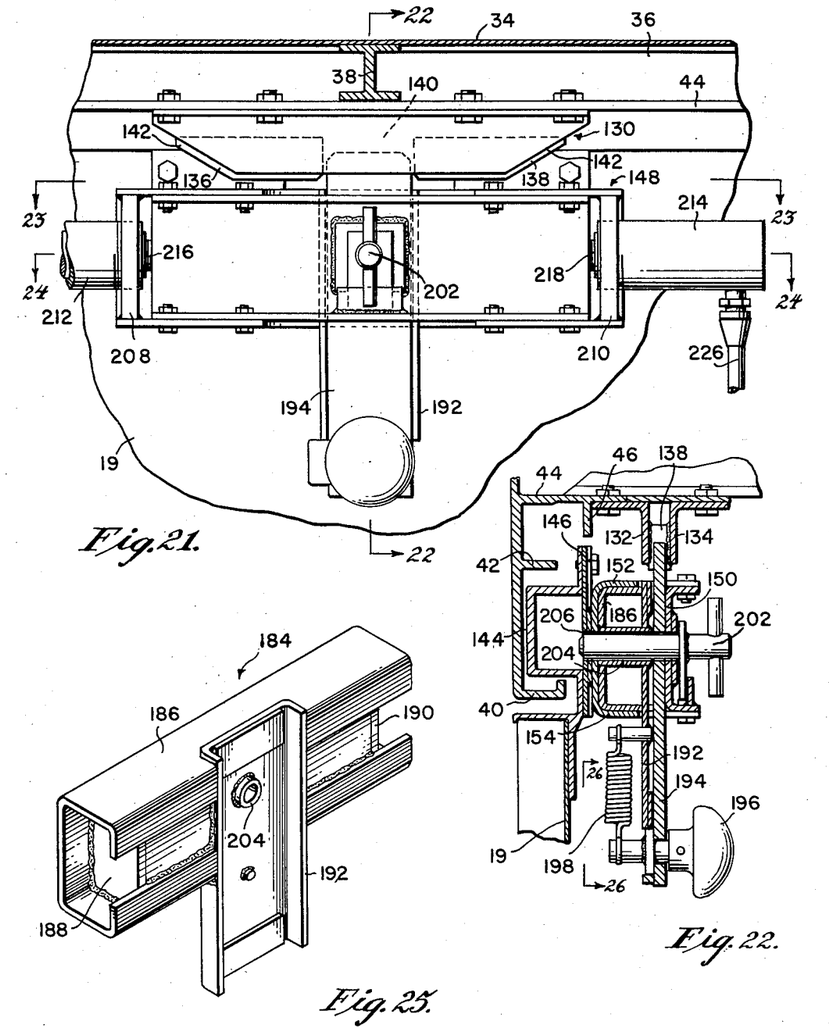
Figure 21 is a sectional view taken on the line 21—21 of Figure 20.
Figure 22 is a sectional view taken on the line 22—22 of Figure 21.
Figure 25 is a perspective view of the slide carriage associated with the jack means.
Figure 23:
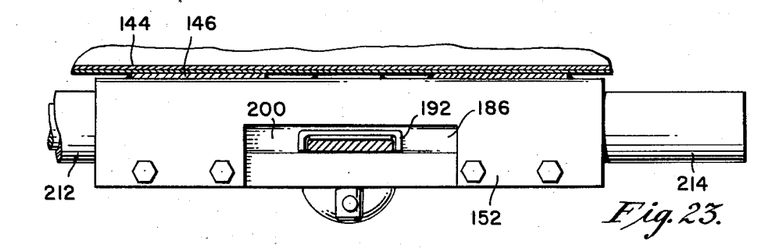
Figure 23 is a sectional view taken on the line 23—23 of Figure 21.
Figure 24:
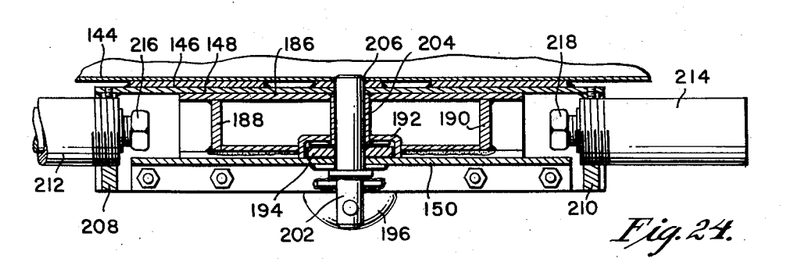
Figure 24 is a sectional view taken on the line 24—24 of Figure 21.
Figure 26:
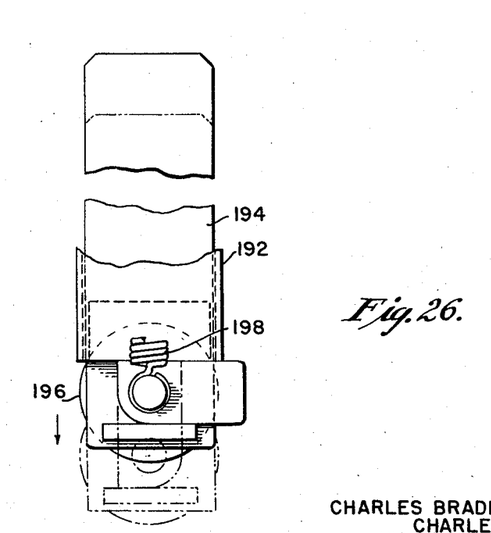
Figure 26 is an elevational view of the latch mechanism.
Figure 27:
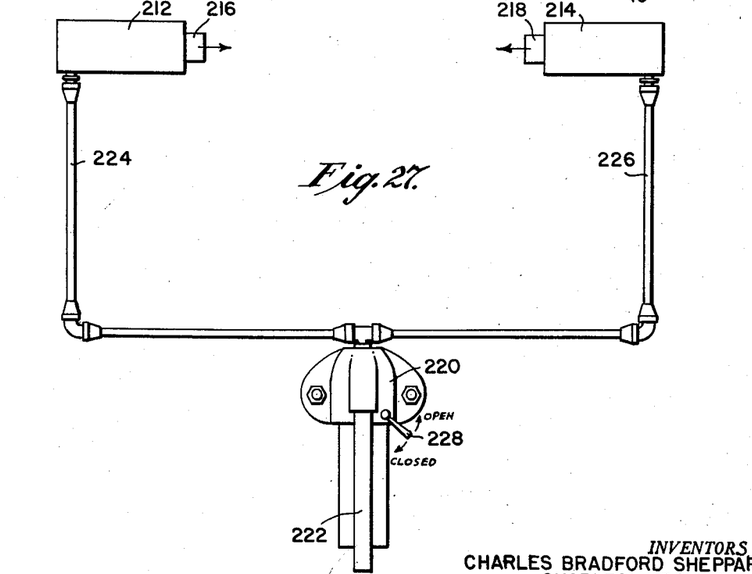
Figure 27 is a diagrammatic view of the jack mechanism.

When the grip 100 is pulled out to the dotted line position of Figure 17, the bar 98 and shaft 94 will also be pulled out and the clutch plates 104 and 106 will engage. Thereafter rotation of the handle in one or the other direction will drive the horizontal chain 52 in either direction. To secure the chain against rotation, the grip 100 is moved inwardly to the solid line position of Figure 17. To releasably shield the end of the grip 100, a plate 108 is provided which carries a stub shaft 110 that is in turn slidably journaled in a bearing 112, the latter being carried by the side wall 18 beneath the floor 24. The inner end of the stub shaft includes a stop 114 and a spring 116 is wound about the stub shaft and interposed between the stop and the side wall. The spring urges the plate 108 towards the side wall and the inturned lip 118 thereof against the bar 98. The plate 108 can be rotated out of engagement with the bar 98 when one is called upon to operate the handle.

The engagement between the horizontal chain 52 and the roof is effected by providing a pair of longitudinally spaced brackets or dogs 120 having horizontal flanges 122 which are bolted as at 124 to the upper horizontal flanges 44 of the roof skirt. The dogs include spaced teeth 126. When the chain 52 is driven in either direction, the teeth 126 of the dogs are engaged between the links of the chain 52 effecting a driving connection between the chain and the roof. Appropriate stops may be associated with the body to limit the outward movement, either way, of the roof.

As stated and illustrated in the aforementioned patent application Serial No. 321,208, now Patent No. 2,757,043, when one of the rear wheels 14 is elevated, the body of the vehicle is distorted relative to the roof because the former is a deep box-like member and the latter is a relatively rigid sheet-like member. Hence when the roof is moved to its fully closed position it will be found that the upper corners of the body are out of alignment with those of the roof thus preventing any possibility of locking the roof in its final closed position.

In the present structure, like the one described in the aforementioned application, a means to redistort the body back to its true rectangular shape is provided but it is simpler, more efficient and easier to operate. The present device combines a means in response to a predetermined movement of the roof to index and lock the roof on the body with the upper corners of one side wall in alignment with the corresponding corners of the roof and a jack means to exert a force substantially parallel to the longitudinal axis of the body which urges the upper corners of the other side wall into alignment with the corresponding corners of the roof.

Attention is directed to Figures 20, 28, 29 and 30 which show the indexing and locking means that is responsive to the movement of the roof to a predetermined position. Adjacent one corner of the roof and to the upper flange 44 thereof is secured as at 128 a longitudinally extending keeper 130 consisting of a pair of transversely spaced plates 132 and 134. Blocks 136 and 138 are secured between the plates in spaced relation at their inner ends to provide a central opening or latch recess 140, the outer ends of said blocks and plates being inclined towards the roof sheet to provide ramps 142.

At the location of the keeper, the profile 144 of the member 26 on the side wall 18 is such that it is half of the member 26 previously described and shown in Figures 9 and 11. Secured to the inner face of the member 144 is a plate 146 to which is secured a box-like member 148 to the front of which is bolted a closure plate 150. The opposing legs 152 and 154 of the member 148 are provided with vertically aligned openings. A vertical guide channel 156 is secured to the closure plate 150 and extends through the vertically aligned openings.

Slidably mounted in the guide 156 is a latch bar 158 through the lower end of which is mounted a handle 160. The shaft 162 of the handle has secured thereto one end of a spring 164 whose other end is attached as at 166 to the guide 156, the spring being tensioned to urge the latch bar 158 into engagement with the keeper 130. Fixedly secured to the shaft 162 of the handle is a bar 168 which, when it abuts the lower end of the guide 156, Figure 28, restrains vertical movement of the latch bar.

To releasably lock the latch bar, the latter is provided with an aperture 170 which is horizontally aligned with a bearing 172 that is carried by the box-like member 148. The bearing opens through the guide 156 at one end and at its other end through an aperture 174 in the member 144 on top of the side wall 18. A locking pin 176 is provided which has a shaft 178 that extends through the aligned apertures 170 and 174 and the bearing 172. The shaft 178 carries a bar 180 which is positionable by rotation of the shaft behind an upstanding lug 182 mounted on the closure plate 150 to prevent retraction of the locking pin.

Figure 28:
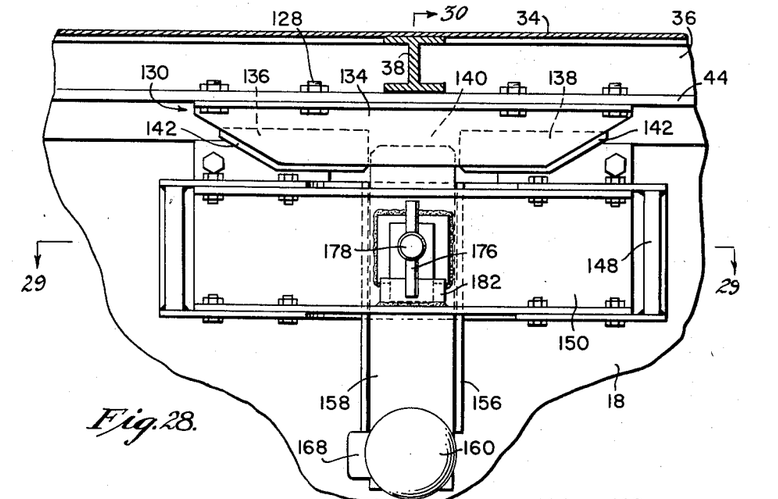
Figure 28 is a sectional view taken on the line 28—28 of Figure 20.
Figures 29, 30:
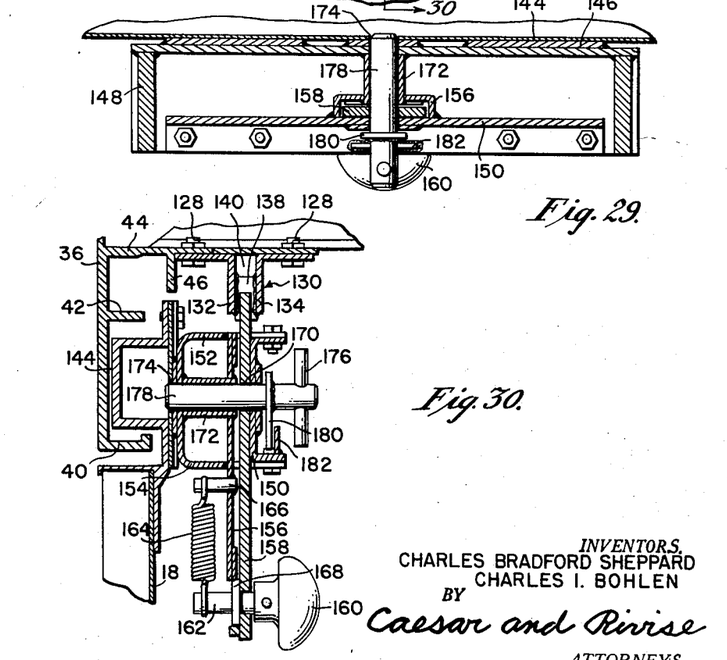
Figure 29 is a sectional view taken on the line 29—29 of Figure 28.
Figure 30 is a sectional view taken on the line 30—30 of Figure 28.

In operation, when the locking pin 176 is retracted, the latch bar 158 is free to slide in the guide 156. When the roof is driven to a closing position a point is reached when the free end of the latch bar 158 engages the inclined ramp 142 on either side of the keeper 130 depending upon the direction of travel of the roof. Continued movement of the roof causes depression of the latch bar against action of the spring 164 until its free end snaps into the recess 140 of the keeper as shown in Figure 28. The locking pin is then reinserted. Thus automatically the upper corners of one side wall 18 of the body are locked in alignment with the corresponding corners of the roof.

Because of body distortion, however, the upper corners of the other side wall 19 are disaligned from the corresponding corners of the roof and it is here where the jack means comes into operation. The jack means includes a latch mechanism to operatively connect the side wall 19 to the roof and a means to apply a jacking force along the longitudinal axis of the body.

The latch mechanism of the jack is the same as the indexing and locking mechanism hereinabove described except that in the box-like member 148 which is secured to the member 144 on the upper end of the other side wall 19 there is slidably mounted for longitudinal movement a member 184. The member 184 includes a C-shaped housing 186 having longitudinally spaced end plates 188 and 190 and a vertical channel 192 secured to and extending beyond the longitudinal sides of the C-shaped housing.

The latch bar 194 which is mounted for vertical sliding movement in the guide 192 is the same in construction as the latch bar 158 and therefore carries an operating handle 196 at its lower end and a spring 198 urging the latch bar upwardly towards the keeper 130. The upper wall 152 of the box-like member 148 includes an elongated slot 200 through which the latch bar extends. The pin 202 which retractably locks the latch bar 194 against movement is the same as the locking pin 176 except that the shaft thereof is adapted to extend through aligned apertures in the closure plate 150, in the latch bar 194, in a bearing 204 carried by the slide member 184, in an aperture in the box-like member 148 and in an aperture 206 in the member 144 on the top of the other side wall 19.

Threaded in the longitudinally opposed ends 208 and 210 of the stationary box-like member 148 are cylinders 212 and 214 in which are slidably mounted rams 216 and 218 which oppose the longitudinal ends 188 and 190 of the slide 184 in which the latch bar is mounted. Mounted on the side wall 19 is a valved hydraulic pump 220 equipped with an operating jack handle 222, the pump being connected by lines 224 and 226 to the cylinders 212 and 214 for actuation of the rams.

In operation, pin 202 is retracted and the slide member 184 is moved by hand until the latch bar 194 snaps into the recess 140 of the keeper. Because of body distortion, one or the other of the end walls 188 and 190 of the slide member will be closer to its corresponding ram 216 or 218. Also, the aperture 206 in the side wall 19 is out of alignment with the bearing 204 and the apertures in the latch bar and closure plate 150.

The valve 228 of the pump is then closed and the handle 222 actuated so that fluid pressure is transmitted to the cylinders 212 and 214. The rams 216 and 218 will move out. The one ram furthest from the corresponding end wall 188 or 190 of the slide member 184 will move outwardly to the limit of its movement. The other ram will engage the other end wall 188 or 190 and thereby force the same and the latch bar 194 carried thereby along a plane parallel to the longitudinal axis of the body until the aperture 206 of the side wall 19 is aligned with the bearing 204. Then the locking pin 202 is inserted through the latch bar and slide member and into the aperture 206, at which point the body has been redistorted so that the upper corners of the other side wall 19 thereof have been aligned with the corresponding corners of the roof.

Figures 3, 5, 6, 7:
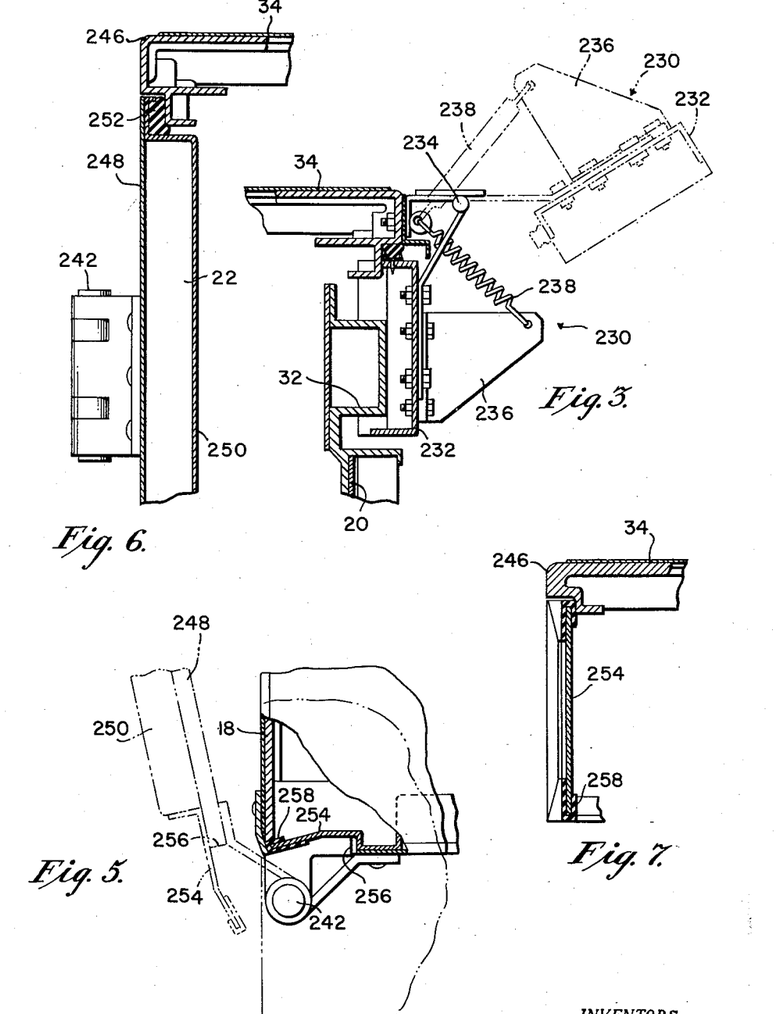
Figure 3 is an enlarged sectional view taken on the line 3—3 of Figure 2.
Figure 5 is an enlarged sectional view taken on the line 5—5 of Figure 4.
Figure 6 is an enlarged sectional view taken on the line 6—6 of Figure 4.
Figure 7 is an enlarged sectional view taken on the line 7—7 of Figure 4.
Figure 4:
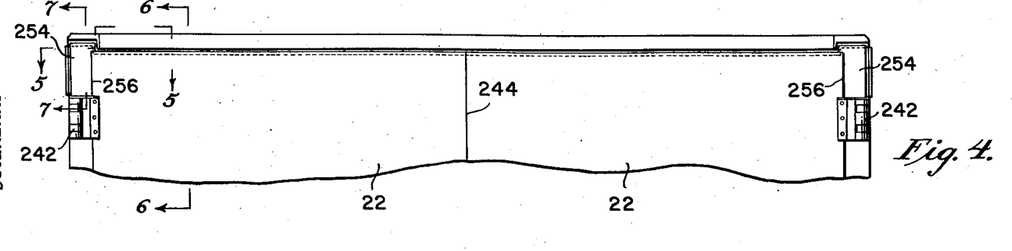
Figure 4 is a fragmentary elevation of the rear of the vehicle looking from the plane of line 4—4 of Figure 1.
Figures 8, 12:
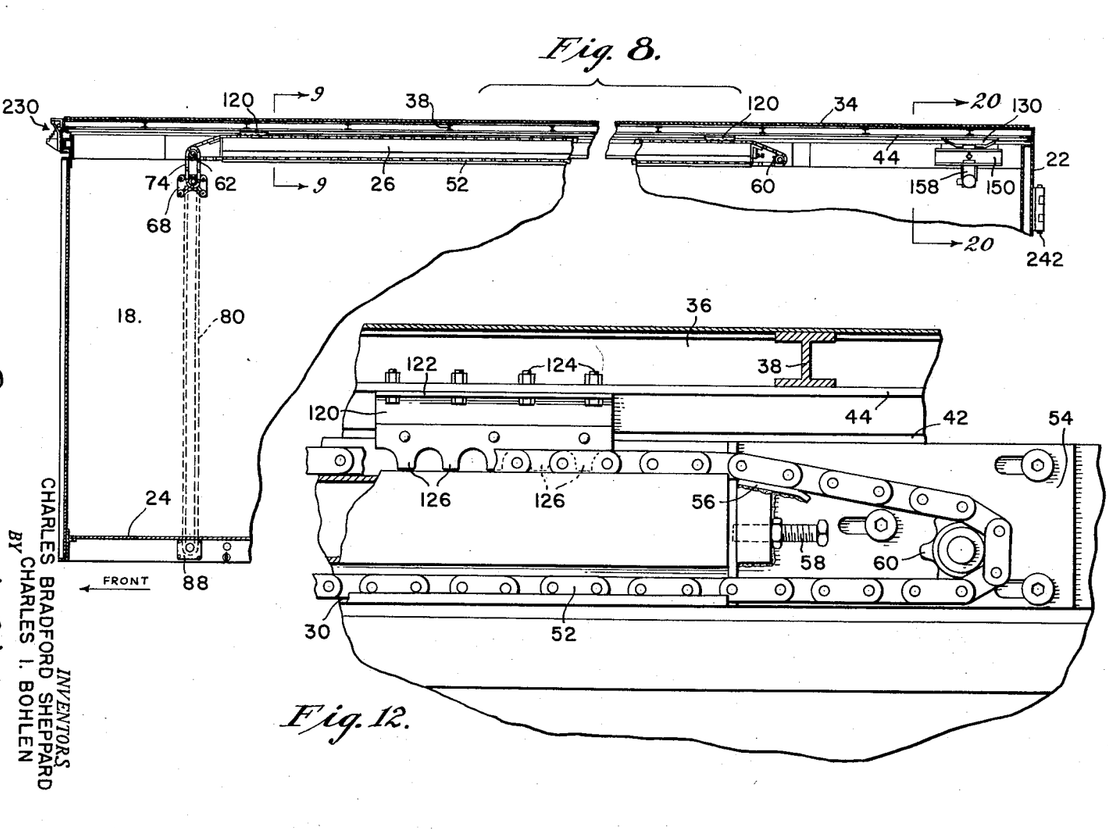
Figure 8 is a broken away sectional view looking from the inside of the body and taken on the line 8—8 of Figure 2.
Figure 12 is a fragmentary enlarged view of an area of Figure 8 showing the front end of the drive chain.

At the front end of the vehicle there is provided a suitable header 230 to close off the roof. The header preferably consists of a transversely extending channel member 232 which is hinged as at 234 to the forward end of the roof sheet 34. Adjacent its ends, the header carries brackets 236 and terminally attached to the brackets and to the forward end of the roof are off-center springs 238. Thus when the header is closed, the lower leg of the channel member 232 underlies the member 32 on the upper edge of the front member 20 of the body as seen in solid lines in Figure 3. When the header is swung to the open position as shown in phantom lines in Figure 3, the off-center springs 238 hold the header properly in place. A handle 240 may be provided on the header to assist in opening and closing the same.

At the rear end of the body, doors 22 are provided which are hinged in a conventional manner as at 242 to the rear vertical ends of the side walls 18 and 19 of the body, the doors having central meeting edges 244. The roof sheet is secured at its rear end to a transverse member 246 of step cross-section. Each door consists preferably of a face sheet 248 secured to an inner hollow shell 250 which is discontinued at its upper end to provide a step carrying a gasket 252 adapted to be positioned in the step of the transverse roof member 246. As will be evident to skilled artisans, the rear upper ends of the side walls 18 and 19, the skirts 36 of the roof and the members 26 secured on the side walls are open. To close them off and thereby shield against weather the roof-mounting rollers, the drive mechanism and some parts of the indexing and jack means, each door has secured thereto an angulated plate 254 which extends laterally beyond the outer edge 256 of the door and vertically upwardly from the upper end of the hinge pin to the step of the transverse roof member 246. The doors in the open position are shown in phantom lines and in the closed position in solid lines in Figure 5. It will be seen that when closed the plate 254 and gasket 258 will abut the side wall and the members on the upper ends thereof to close off the drive mechanism, mounting rollers, etc.

While a preferred embodiment of the invention has been shown and described hereabove, it will be understood that minor variations can be made in the construction and arrangement of parts without departing from the spirit of the invention and the scope of the appended claims.

We claim:

1. In a rectangular vehicle body having side and end walls, a movable roof mechanism comprising a rectangular roof sheet slidably mounted on the top of the body, means carried by the body and operatively connected to the roof sheet to selectively drive the roof sheet two ways longitudinally of the body, means operative in response to predetermined movement of the roof for automatically locating and locking the roof to the body with the upper corners of one side wall of the body in alignment with the corresponding corners of the roof sheet, and means operatively connected between the other side wall of the body and said roof sheet for exerting a force longitudinally of the body to force the upper corners of said other side wall of the body into alignment with the corresponding corners of the roof sheet.

2. The combination of claim 1 wherein said locating and locking means comprises a keeper depending from said roof sheet adjacent one corner thereof, said keeper including a pair of oppositely inclined ramps and a recess therebetween and a latch mechanism secured to said one side wall adjacent one corner of the body, said latch mechanism including a vertically slidable latch bar and resilient means urging the same upwardly and into engagement with either of said ramps, the latter serving to depress said latch bar until it snaps into said recess.

3. The combination of claim 2 and a retractable means to releasably lock said latch bar against sliding movement.

4. In a rectangular vehicle body having side and end walls, a movable roof mechanism comprising, a rectangular roof slidably mounted on the top of the body, means operatively connected between the body and the roof to selectively drive the roof two ways longitudinally of the body, means operative in response to predetermined movement of the roof for automatically locating and locking the roof to the body with the upper corners of one side of the body in alignment with the corresponding corners of the roof, and jack means for exerting a force longitudinally of the body to force the upper corners of said other side wall into alignment with the corresponding corners of the roof, said jack means comprising, a latch mechanism mounted for longitudinal sliding movement on said other side wall adjacent one corner of the body, a keeper depending from said roof adjacent the corresponding corner thereof, said latch mechanism including opposite ends spaced longitudinally of the body, a latch bar mounted for vertical sliding movement in said latch mechanism, resilient means urging said latch bar towards said keeper, and means for applying a force longitudinally of the body on either of said opposite ends of said latch mechanism after said latch bar has engaged said keeper.

5. The subject matter as claimed in claim 4 wherein said force applying means comprises, hydraulic rams operative against said opposite ends of said latch mechanism to move the latch mechanism in either direction.

6. The combination of claim 5 and a locking pin extending retractably through said latch bar and said latch mechanism and into an aperture provided in said other side wall of the body to releasably retain said latch mechanism against longitudinal movement, said locking pin being reinsertable in said side wall aperture through said latch bar and latch mechanism after said force is applied on either of said opposite ends of the latch mechanism to force the upper corners of said other side wall into alignment with the corresponding corners of the roof.

7. In a rectangular vehicle body having side and end walls, a movable roof mechanism comprising, a rectangular roof slidably mounted on the top of the body, driving means carried by the body and operatively connected to the roof to selectively drive the roof two ways longitudinally of the body, said driving means including longitudinally spaced sprockets rotatably mounted on one side wall of the body, an endless generally horizontally disposed chain entrained over said sprockets, at least one toothed bracket depending from said roof and adapted to engage said chain and means for selectively driving said chain in clockwise and counterclockwise directions, means operative in response to predetermined movement of the roof for automatically locating and locking the roof to the body with the upper corners of the one side wall of the body in alignment with the corresponding corners of the roof, and means operatively mounted between the other side wall of the body and the roof for exerting a force longitudinally of the body to force the upper corners of said other side wall into alignment with the corresponding corners of the roof.

8. The combination of claim 7 wherein said means for selectively driving said chain includes a further sprocket rotatably mounted on said one side wall beneath one of said sprockets, a generally vertically disposed endless chain entrained over said further sprockets and said one sprocket, an operating handle, clutch means to selectively connect said handle to and disconnect it from said further sprockets.

9. In a rectangular vehicle body having side and end walls, a movable roof mechanism comprising, a rectangular roof slidably mounted on the top of the body, means operatively connected between said roof and said body to drive the roof longitudinally of the body, means operative in response to predetermined movement of the roof for automatically locating and locking the roof to the body with the upper corners of one side wall of the body in alignment with the corresponding corners of the roof, and means for longitudinally forcing the upper corners of said other side wall of the body into alignment with the corresponding corners of the roof.

10. The combination as claimed in claim 9 wherein said locating and locking means comprises a keeper mounted on said roof, and a latch mechanism mounted on said one side wall and adapted to engage said keeper when the upper corners of said one side wall are aligned with the corresponding corners of said roof.

11. In a rectangular vehicle body having side and end walls, a movable roof mechanism comprising, a rectangular roof slidably mounted on the top of the body, means operatively connected between the body and the roof to selectively drive the same longitudinally of the body, means operative in response to predetermined movement of the roof for automatically locating and locking the roof to the body with the upper corners of one side wall of the body in alignment with the corresponding corners of the roof, and means operatively connected between the body and the roof for exerting a force in either longitudinal direction to force the upper corners of said other side wall of the body into alignment with the corresponding corners of the roof.

12. A vehicle body having parallel rigid side walls, a rectangular roof surmounting said side walls normally positioned with the corners thereof in alignment with the corners of said walls and slidably movable forwardly and rearwardly from said position, means operatively connected between the body and the roof to selectively slidably actuate said roof longitudinally of the body, means for detachably connecting the roof to one side of the body for locking the roof to said one side with the roof normally positioned with respect to said one side, and means detachably interconnecting the other side of the body and said roof operative to exert force longitudinally of the body to move the corners of said other side wall into alignment with the adjacent corners of the roof.

13. A vehicle body having parallel rigid side walls, a rectangular roof surmounting said side walls normally positioned with the corners thereof in alignment with the corners of said walls and slidably movable forwardly and rearwardly from said position, means operatively connected between the body and the roof to selectively slidably actuate said roof longitudinally of the body, means carried by the roof and one side of the body for locking the roof to said one side with the roof in its normal position with respect to said one side, means interconnecting the other side of the body and said roof operative to exert force longitudinally of the body to move the corners of said other side wall into alignment with the adjacent corners of the roof, and means connected to said roof and said other side wall for locking said roof to said other side wall when the corners thereof are aligned with each other.

14. A vehicle body having parallel rigid side walls, a rectangular roof surmounting said side walls normally positioned with the corners thereof in alignment with the corners of said walls and slidably movable forwardly and rearwardly from said position, means operatively connected between the body and the roof to selectively slidably actuate said roof longitudinally of the body, means carried by the roof and one side of the body for locking the roof to said one side with the roof in its normal position with respect to said one side, a keeper fixed to and depending from said roof, a latch mechanism mounted for longitudinal sliding movement on said other wall having fixed spaced front and rear ends and including a latch bar movable with said latch mechanism and interlockingly engageable with said keeper, and means for applying a force longitudinally of the body on either of the ends of said latch mechanism after said latch bar has engaged said keeper for exerting a force longitudinally of the body to move the corners of said other side wall into alignment with the adjacent corners of said roof.

15. A vehicle body having parallel rigid side walls, a rectangular roof surmounting said side walls normally positioned with the corners thereof in alignment with the corners of said walls and slidably movable forwardly and rearwardly from said position, means operatively connected between the body and the roof to selectively slidably actuate said roof longitudinally of the body, means carried by the roof and one side of the body for locking the roof to said one side with the roof in its normal position with respect to said one side, a keeper fixed to and depending from said roof, a latch mechanism mounted for longitudinal sliding movement on said other wall having fixed spaced front and rear ends and including a latch bar movable with said latch mechanism and interlockingly engageable with said keeper, means for applying a force longitudinally of the body on either of the ends of said latch mechanism after said latch bar has engaged said keeper for exerting a force longitudinally of the body to move the corners of said other side wall into alignment with the adjacent corners of said roof, and means for detachably connecting said sliding latch mechanism to said other wall when the corners of said other wall are in alignment with the adjacent corners of said roof whereby to hold said corners in alignment independently of said force applying means.

16. A vehicle body having parallel rigid side walls, a rectangular roof surmounting said side walls normally positioned with the corners thereof in alignment with the corners of said walls and slidably movable from said position longitudinally of said body, means carried by the roof and one side of the body for locking the roof to said one side with the roof in its normal position with respect to said one side, latch means having a pair of detachable interlocking parts, one of said parts being connected to said roof and the other of said parts being connected to the other side wall, means mounting one of said parts for adjustment longitudinally of the body and relative to the other of said parts, and means for applying a force longitudinally of the body on said adjustable part for exerting a force longitudinally of said body when said parts are mutually interlocked to move the corners of said other side wall into alignment with the adjacent corners of said roof.

17. A vehicle body having parallel rigid side walls, a rectangular roof surmounting said side walls normally positioned with the corners thereof in alignment with the corners of said walls and slidably movable longitudinally of the vehicle in at least one direction from said position, means for detachably connecting the roof to one side of the body with the roof normally positioned with respect to said one side, and means detachably interconnecting the other side of the body and said roof operative to exert force longitudinally of the body to move the corners of said other side wall into alignment with the adjacent corners of the roof.

18. A vehicle body having paralled rigid side walls, a rectangular roof surmounting said side walls normally positioned with the corners thereof in alignment with the corners of said walls and slidably movable longitudinally of the body in at least one direction from said position, means connected to said body and said roof operable to selectively slidably actuate said roof longitudinally of the body, means for detachably connecting the roof to one side of the body with the roof normally positioned with respect to said one side, and means detachably interconnecting the other side of the body and said roof operative to exert force longitudinally of the body to move the corners of said other side wall into alignment with the adjacent corners of the roof.

References Cited in the file of this patent
UNITED STATES PATENTS

| | | |
|---|---|---|
| 312,785 | Wyman | Feb. 24, 1885 |
| 404,880 | Wheat | June 11, 1889 |
| 1,395,129 | McCorkindale | Oct. 25, 1921 |
| 1,712,363 | Sparshatt | May 7, 1929 |
| 2,014,140 | Larsen | Sept. 10, 1935 |
| 2,140,960 | Kercher | Dec. 20, 1938 |
| 2,159,022 | Hawkins | May 23, 1939 |
| 2,202,115 | Marinello | May 28, 1940 |